(12) United States Patent
Asaoka et al.

(10) Patent No.: US 8,657,104 B2
(45) Date of Patent: Feb. 25, 2014

(54) BELT POSITIONING SYSTEM, MULTI-ROLLER ASSEMBLY AND IMAGE FORMING APPARATUS EMPLOYING SAME

(71) Applicants: Akira Asaoka, Kanagawa (JP); Kazuchika Saeki, Kanagawa (JP); Yuuji Sawai, Kanagawa (JP); Yoshiki Hozumi, Kanagawa (JP)

(72) Inventors: Akira Asaoka, Kanagawa (JP); Kazuchika Saeki, Kanagawa (JP); Yuuji Sawai, Kanagawa (JP); Yoshiki Hozumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/859,192

(22) Filed: Apr. 9, 2013

(65) Prior Publication Data

US 2013/0306441 A1 Nov. 21, 2013

(30) Foreign Application Priority Data

May 17, 2012 (JP) ................................ 2012-113435

(51) Int. Cl.
*B65G 39/16* (2006.01)

(52) U.S. Cl.
USPC .......................................... 198/806; 198/807

(58) Field of Classification Search
USPC .................................. 198/806, 837
See application file for complete search history.

(56) References Cited

U.S. PATENT DOCUMENTS

| | | | | |
|---|---|---|---|---|
| 2,655,252 A * | 10/1953 | Spurgeon | ...................... | 198/806 |
| 4,077,510 A * | 3/1978 | Muller | ........................... | 198/840 |
| 4,286,706 A * | 9/1981 | Castelli et al. | ................ | 198/806 |
| 5,659,851 A * | 8/1997 | Moe et al. | ..................... | 399/165 |
| 5,960,243 A * | 9/1999 | Daigo et al. | ................... | 399/329 |
| 6,002,908 A * | 12/1999 | Hayashi et al. | ............... | 399/312 |
| 6,053,832 A * | 4/2000 | Saito | ............................ | 474/122 |
| 6,088,566 A * | 7/2000 | Todome | ........................ | 399/303 |
| 6,505,026 B2 * | 1/2003 | Hayakawa et al. | ........... | 399/303 |
| 6,830,212 B1 * | 12/2004 | Harris | ........................ | 242/615.1 |
| 6,866,176 B2 * | 3/2005 | Harris | .............................. | 226/23 |
| 6,912,371 B2 * | 6/2005 | Sato | ............................... | 399/329 |
| 7,242,897 B2 * | 7/2007 | Satoh et al. | ................... | 399/329 |
| 7,761,045 B2 * | 7/2010 | Fujimori et al. | .............. | 399/329 |
| 7,815,042 B2 * | 10/2010 | Oishi | ............................. | 198/837 |
| 8,157,684 B2 * | 4/2012 | Ito | ................................. | 474/237 |
| 8,165,511 B2 * | 4/2012 | Nakamura et al. | ............ | 399/302 |
| 8,433,225 B2 * | 4/2013 | Michibata | ..................... | 399/302 |

FOREIGN PATENT DOCUMENTS

| | | |
|---|---|---|
| JP | 2006-078612 | 3/2006 |
| JP | 2009-186910 | 8/2009 |
| JP | 2009-288426 | 12/2009 |

OTHER PUBLICATIONS

U.S. Appl. No. 13/859,118, filed Apr. 9, 2013, Asaoka, et al.
U.S. Appl. No. 13/869,286, filed Apr. 24, 2013, Hozumi, et al.
U.S. Appl. No. 13/859,118, filed Apr. 9, 2013.
U.S. Appl. No. 13/869,286, filed Apr. 24, 2013.

* cited by examiner

*Primary Examiner* — Douglas Hess
(74) *Attorney, Agent, or Firm* — Oblon, Spivak, McClelland, Maier & Neustadt, L.L.P.

(57) ABSTRACT

A belt positioning system for positioning a movable belt entrained about a plurality of generally parallel rollers for moving in a trans-axial direction perpendicular to an axial direction in which the rollers extend parallel to each other includes a tapered flange. The tapered flange is operatively connected to an axial end of a specific one of the plurality of generally parallel rollers, and includes a generally planar contact surface and an angled guide surface. The generally planar contact surface extends generally perpendicular to the axial direction to contact an adjoining edge of the belt. The angled guide surface extends radially outward from the contact surface and has a diameter increasing outward in the axial direction.

17 Claims, 8 Drawing Sheets

US 8,657,104 B2

BELT POSITIONING SYSTEM, MULTI-ROLLER ASSEMBLY AND IMAGE FORMING APPARATUS EMPLOYING SAME

CROSS-REFERENCE TO RELATED APPLICATION

The present patent application claims priority pursuant to 35 U.S.C. §119 from Japanese Patent Application No. 2012-113435, filed on May 17, 2012, which is hereby incorporated by reference herein in its entirety.

BACKGROUND OF THE INVENTION

1. Technical Field

The present invention relates to a belt positioning system and a multi-roller assembly and image forming apparatus employing the same, and more particularly, to a system for positioning a movable belt entrained about a plurality of rollers, and a multi-roller belt support assembly and an image forming apparatus employing the belt positioning system.

2. Background Art

Image forming apparatuses employ various types of movable imaging belts, such as an intermediate transfer belt, a media conveyance belt, and a fixing belt, each of which is entrained about a plurality of generally parallel rollers for moving in a trans-axial direction perpendicular to an axial direction in which the rollers extend parallel to each other.

One problem associated with a multi-roller belt support assembly is that the movable belt occasionally walks or moves laterally in the axial direction due to a lack of parallel alignment between the belt support rollers, which results, for example, from wear and tear of equipment used to rotate the belt support rollers. Such lateral displacement of the belt, if not corrected, would cause breakage or failure of the imaging process where the belt reaches the axial end of the roller and eventually slips off the belt support assembly.

To address this problem, several techniques have been proposed which employ a positioning flange connected to an axial end of the belt support roller to prevent lateral displacement of the belt. For example, a known belt driver system employs an annular positioning flange disposed around the roller end in combination with a guide wheel disposed inward from the flange in the axial direction to contact an edge or near-edge portion of the belt to restrict lateral movement of the belt.

The inventors have recognized that one problem encountered when using a movable belt entrained about a flanged roller is that the belt is subjected to excessive load where the flange interferes with an adjoining edge of the belt, which is particularly the case where the belt has an irregular, jagged projection along its edge, for example, due to improper cutting during manufacture.

SUMMARY OF THE INVENTION

Exemplary aspects of the present invention are put forward in view of the above-described circumstances, and provide a novel belt positioning system for positioning a movable belt entrained about a plurality of generally parallel rollers for moving in a trans-axial direction perpendicular to an axial direction in which the rollers extend parallel to each other.

In one exemplary embodiment, the belt positioning system includes a tapered flange. The tapered flange is operatively connected to an axial end of a specific one of the plurality of generally parallel rollers, and includes a generally planar contact surface and an angled guide surface. The generally planar contact surface extends generally perpendicular to the axial direction to contact an adjoining edge of the belt. The angled guide surface extends radially outward from the contact surface and has a diameter increasing outward in the axial direction.

Other exemplary aspects of the present invention are put forward in view of the above-described circumstances, and provide a multi-roller assembly employing the belt positioning system.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
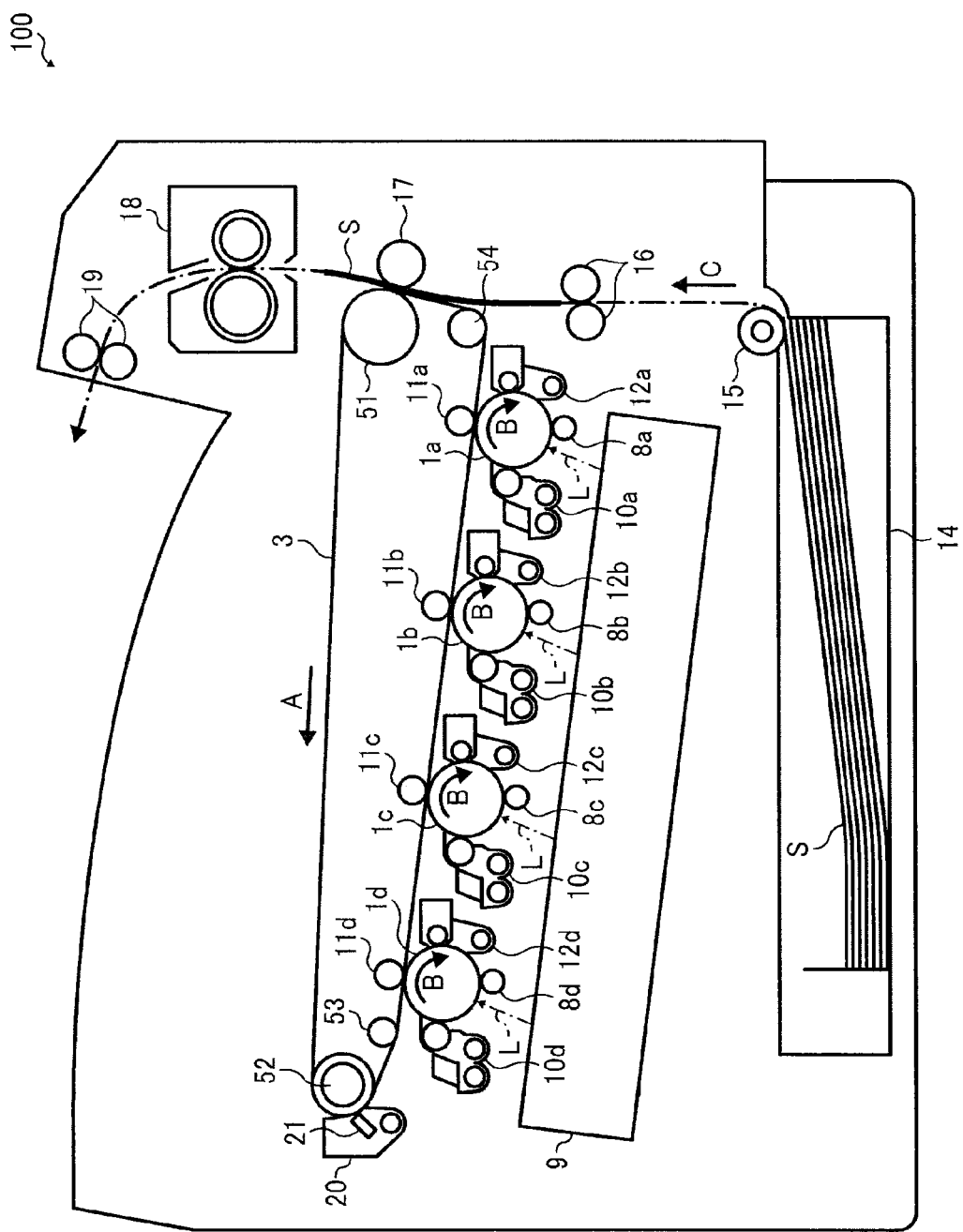
FIG. 1 schematically illustrates an image forming apparatus according to one or more embodiments of this patent specification.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, exemplary embodiments of the present patent application are described.

FIG. 1 schematically illustrates an image forming apparatus 100 according to one or more embodiments of this patent specification.

As shown in FIG. 1, the image forming apparatus 100 comprises a tandem color printer that employs four imaging stations, including first through fourth photoconductors 1a, 1b, 1c, and 1d arranged in series, for forming toner images with four different colors: black, magenta, cyan, and yellow. Since the imaging stations are of an identical configuration except for the color of toner used for image formation, features of the photoconductor and its associated imaging equipment described herein apply to all the imaging stations unless otherwise indicated.

In each imaging station, the photoconductor 1 is rotatable in a direction indicated by arrow B, while surrounded by various pieces of imaging equipment, including a discharging device, a charging device 8, a development device 10, and a cleaning device 12, with an exposure device 9 directing a laser beam L to the photoconductive surface, which work in cooperation with each other to form a toner image on the photoconductive surface.

Also included in the image forming apparatus 100 is an intermediate transfer device including an intermediate transfer belt 3 disposed opposite and in contact with the photoconductors 1a, 1b, 1c, and 1d. The intermediate transfer belt 3 is entrained about a plurality of belt support rollers, including a driver roller 51 equipped with a suitable rotary actuator, as well as idler rollers 52, 53, and 54, aligned generally parallel to each other. As the driver roller 51 rotates, the belt 3 rotates in a direction indicated by arrow A in conjunction with the idler rollers 52, 53, and 54.

In the present embodiment, the intermediate transfer belt 3 comprises a looped belt consisting of one or more layers of material. In the case of a mono-layered belt, the belt material may be selected from polyvinylidene difluoride (PVDF), polycarbonate (PC), and polyimide (PI). In the case of a poly-layered belt, the belt may be formed of a substrate of relatively rigid fluorine rubber, PVDF, or polyimide resin, with a smooth coating of fluorine resin deposited on the substrate.

Four primary transfer rollers 11a, 11b, 11c, and 11d are disposed opposite the photoconductors 1a, 1b, 1c, and 1d, respectively, via the intermediate transfer belt 3 to form four primary transfer nips therebetween, through each of which the toner image is primarily transferred from the photoconductor 1 to the belt 3. A secondary transfer roller 17 is disposed opposite the belt support roller 51 via the intermediate transfer belt 3 to form a secondary transfer nip therebetween, through which the toner image is secondarily transferred from the belt 3 to a recording medium, such as a sheet of paper S.

Additionally, a belt cleaner 20 may be disposed opposite the belt-support roller 52 to remove untransferred, residual toner particles that remain on the belt surface after secondary image transfer.

In the present embodiment, the belt cleaner 20 includes a cleaning blade 21 of suitable material, such as urethane, held against the belt 3 to mechanically remove or scrape toner residues from the belt surface. Alternatively, instead of or in combination with a cleaning blade, any suitable cleaning device may be used to clean the intermediate transfer belt 3, including, for example, an electrostatic cleaning device for electrostatically removing toner residues from the belt surface.

At the bottom of the apparatus 100 lies a sheet tray 14 accommodating a stack of recording sheets S. A feed roller 15 is disposed at an outlet of the sheet tray 14 to advance the recording sheet S in a direction indicated by arrow C into a sheet conveyance path defined by a suitable sheet conveyance device, including, for example, a movable belt entrained around a plurality of belt support rollers.

Along the sheet conveyance path is a pair of registration roller 16 for introducing the recording sheet S into the secondary transfer nip. A fixing device 18 is disposed downstream from the secondary transfer nip, which includes, for example, a movable belt entrained around a plurality of belt support rollers to fix the toner image on the recording sheet S. The sheet conveyance path terminates in an output unit including a pair of output rollers 19, which outputs the recording sheet S from inside the apparatus body.

During operation, in each imaging station, the photoconductor 1 rotates to forward its outer, photoconductive surface to a series of electrophotographic processes, including charging, exposure, development, transfer, and cleaning, in one rotation of the photoconductor 1.

First, after being exposed to light radiation from the discharging device which removes residual electrical charges for initialization, the photoconductive surface is uniformly charged, for example, to a negative potential by the charging device 8 and subsequently exposed to a modulated laser beam L emitted from the exposure device 9. The laser exposure selectively dissipates the charge on the photoconductive surface to form an electrostatic latent image thereon according to image data representing a particular primary color. Then, the latent image enters the development device 10, which renders the incoming image visible using toner. The toner image thus obtained is forwarded to the primary transfer nip between the intermediate transfer belt 3 and the primary transfer roller 11.

At the primary transfer nip, the primary transfer roller 11 is supplied with a bias voltage of a polarity opposite that of the toner on the photoconductor 1 (for example, a positive bias voltage where the toner assumes a negative charge). This electrostatically transfers the toner image from the photoconductive surface to an outer surface of the belt 3, with a certain small amount of residual toner particles left on the photoconductive surface. Such transfer process occurs sequentially at the four primary transfer nips along the belt travel path, so that toner images of different colors are superimposed one atop another to form a single multicolor image on the surface of the intermediate transfer belt 3.

After primary transfer, the photoconductive surface enters the cleaning device 12 to remove residual toner, and then to the discharging device to remove residual charges for completion of one imaging cycle. At the same time, the intermediate transfer belt 3 forwards the multicolor image to the secondary transfer nip between the belt support roller 51 and the secondary transfer roller 17.

Meanwhile, in the sheet conveyance path, the feed roller 15 rotates to introduce a recording sheet S from the sheet tray 14 toward the pair of registration rollers 16 being rotated. Upon receiving the fed sheet S, the registration rollers 16 stop rotation to hold the incoming sheet S therebetween, and then advance it in sync with the movement of the intermediate transfer belt 3 to the secondary transfer nip. At the secondary transfer nip, the multicolor image is transferred from the belt 3 to the recording sheet S, with a certain small amount of residual toner particles left on the belt surface.

After secondary transfer, the intermediate transfer belt 3 enters the belt cleaner 20, which removes residual toner from the intermediate transfer belt 3. At the same time, the recording sheet S bearing the powder toner image thereon is introduced into the fixing device 20, which fixes the multicolor image in place on the recording sheet S with heat and pressure.

Thereafter, the recording sheet S is output by the output rollers 19 for stacking outside the apparatus body, which completes one operational cycle of the image forming apparatus 100.

A description is now given of specific features of the image forming apparatus 100 according to one or more embodiments of this patent specification. In each of these embodiments, a belt positioning system 50 is described employed in a multi-roller belt support assembly, which is applicable to the intermediate transfer device, the sheet conveyance device, and the fixing device included in the image forming apparatus 100.

Figure 2A:
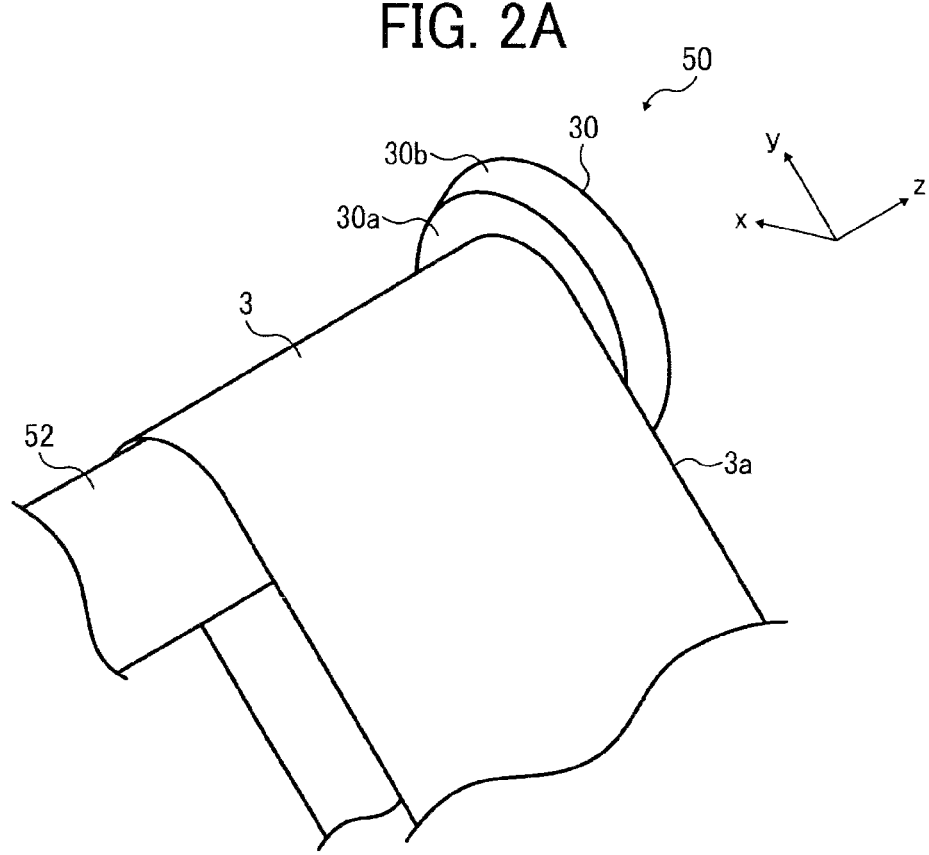
FIGS. 2A and 2B are partial perspective and plan views, respectively, of a belt positioning system according to one embodiment of this patent specification.
Figure 2B:
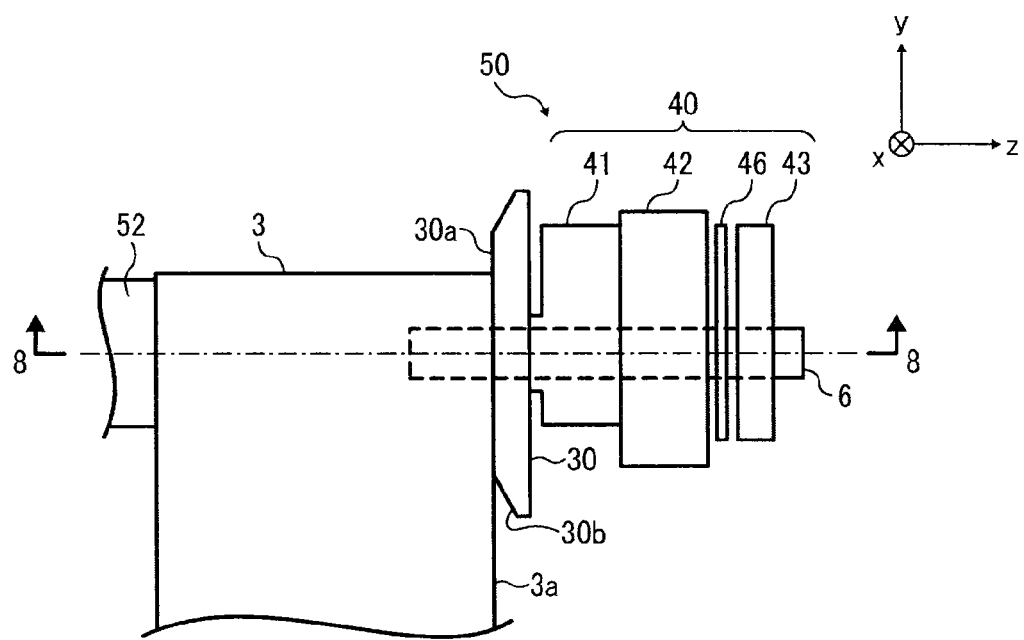

FIGS. 2A and 2B are partial perspective and plan views, respectively, of the belt positioning system 50 according to one embodiment of this patent specification, exemplarily provided in the intermediate transfer device included in the image forming apparatus 100 of FIG. 1.

As shown in FIGS. 2A and 2B, the intermediate transfer belt 3 is entrained about the plurality of generally parallel rollers 51 through 54, of which only one specific roller 52 is visible, for moving in a trans-axial direction perpendicular to an axial direction Z in which the rollers extend parallel to each other.

The belt positioning system 50 includes a tapered flange 30 operatively connected to an axial end of the roller 52. The tapered flange 30a includes a generally planar contact surface 30a extending generally perpendicular to the axial direction Z to contact an adjoining edge 3a of the belt 3, and an angled guide surface 30b extending radially outward from the contact surface 30a and having a diameter increasing outward in the axial direction Z.

Additionally, the roller 52 has a shaft 6 extending outward in the axial direction Z from the axial end thereof on which the tapered flange 30 is supported. A belt alignment mechanism 40 may be disposed around the roller shaft 6 outward from the tapered flange 30 in the axial direction Z to correct the lateral position of the belt 3 by inclining the roller 52 with respect to others of the plurality of generally parallel rollers.

As used herein, the term "axial direction" refers to a reference, longitudinal direction in which a central, rotational axis of the roller extends in its normal operational position, as indicated by the axis Z in the drawings. The terms "inward" and "outward", when used in connection with the axial direction, indicates an element moves or otherwise changes in position, size, and/or shape toward and away from, respectively, an axial, longitudinal center of the roller. The term "trans-axial direction" refers to a given direction perpendicular to the axial direction Z in which the belt is movable, as indicated by the axes X and Y in the drawings. In the present embodiment, for example, the trans-axial directions X and Y are vertical and horizontal, respectively.

In the belt positioning system 50, the tapered flange 30 serves to correct the lateral position of the belt 3 where the belt 3 moves laterally outward in the axial direction Z, for example, due to a lack of parallel alignment between the belt supporting rollers.

During operation, as the driver roller 51 rotates, the belt 3 rotates or moves in the trans-axial direction Y to in turn cause the roller 52 to rotate. As the belt 3 moves laterally outward in the axial direction Z along the roller 52, the generally planar contact surface 30a contacts the belt edge 3a to prevent further displacement of the belt 3. Further, should the belt 3 move laterally outward in the axial direction Z beyond the contact surface 30a, the angled guide surface 30b guides the belt edge 3a to move backward toward the contact surface 30a, thereby maintaining the belt 3 in its proper lateral position in the axial direction Z.

The inventors have recognized that one problem encountered when using a movable belt entrained about a flanged roller is that the belt is subjected to excessive load where the flange interferes with an adjoining edge of the belt, which is particularly the case where the belt has an irregular, jagged projection along its edge, for example, due to improper cutting during manufacture.

Figure 3:
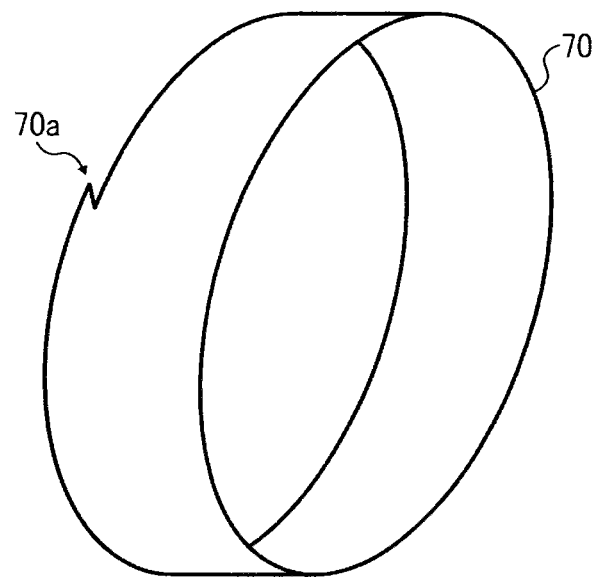
FIG. 3 is a perspective view of a movable belt having a jagged projection along its edge.
Figure 4:
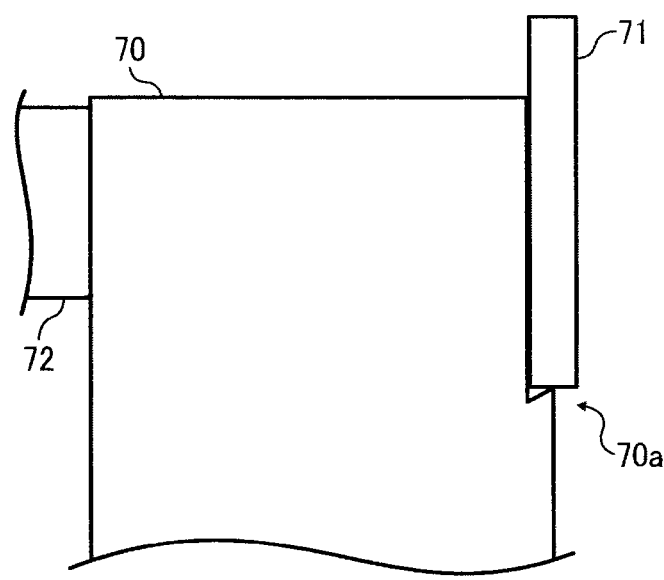
FIG. 4 is a partial plan view of the movable belt entrained around a flanged roller.

With reference to FIGS. 3 and 4, consider a looped movable belt 70 having a jagged projection 70a along its edge is installed in a multi-roller assembly that includes a roller 72 with a non-tapered positioning flange 71 at an axial end of the roller 72 for correcting the lateral position of the belt 70. In such cases, the belt edge can excessively press against the positioning flange 71 upon lateral displacement of the belt 70. In particular, where the projection 70a becomes stuck on the corner of the non-tapered flange 71, moving the belt 70 in the trans-axial direction substantially strains the belt edge, resulting in cracks or other defects propagating from the edge portion of the belt.

These and other problems are effectively addressed by the belt positioning system 50 according to this patent specification, in which providing the flange 30 with the combination of the generally planar contact surface 30a and the angled guide surface 30b effectively prevents strain and concomitant defects on the edge portion of the belt 3.

With additional reference to FIGS. 5A and 5B, 6A and 6B, and 7A and 7B, the belt 3 having a jagged projection 3a1 on the belt edge 3a is shown entrained around the roller 52 equipped with the tapered flange 30.

Figure 5A:
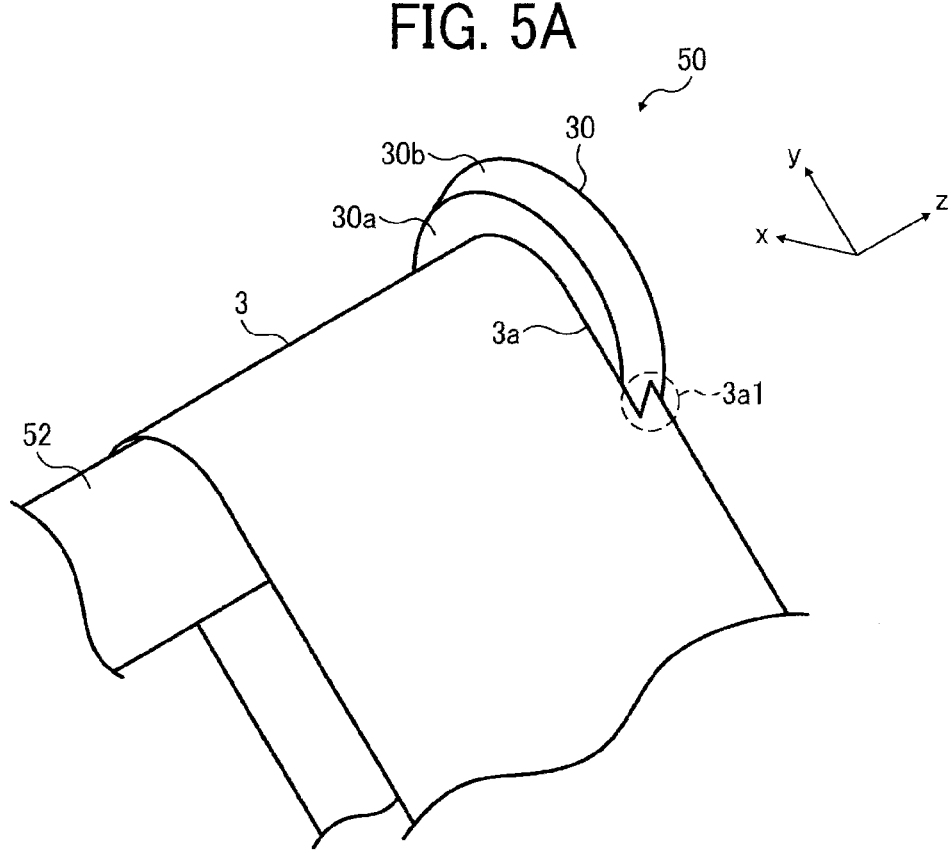
FIGS. 5A and 5B are partial perspective and plan views, respectively, of the belt positioning system of FIGS. 2A and 2B.
Figure 5B:
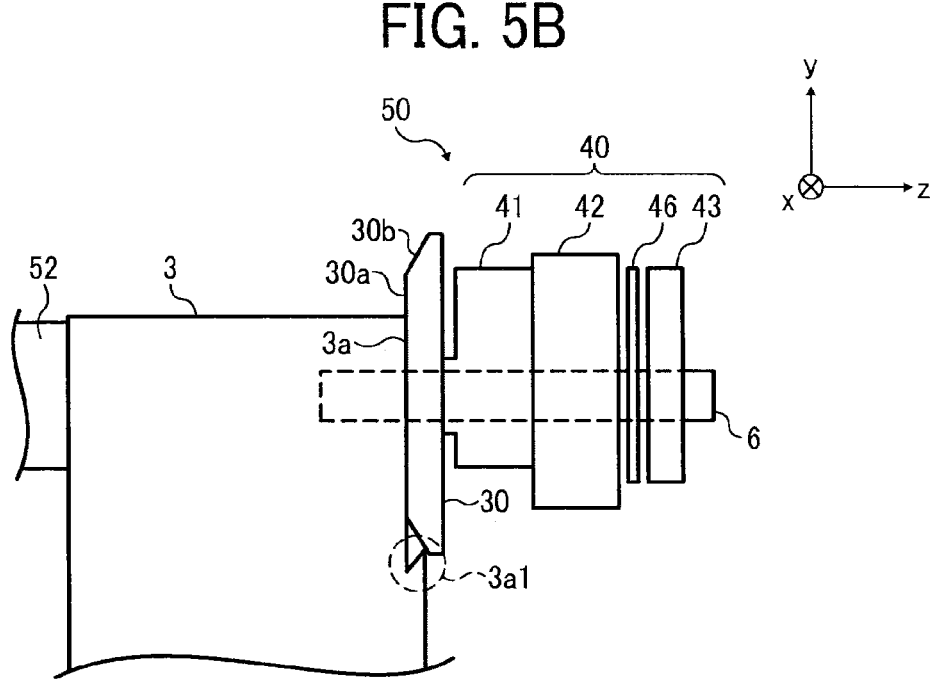

As shown in FIGS. 5A and 5B, as the belt 3 moves in the trans-axial direction Y, the projection 3a1 on the belt edge 3a reaches the tapered flange 30 at the axial end of the roller 52. With a preceding smooth part of the belt edge 3a in contact with the generally planar contact surface 30a, the projection 3a1 initially meets the angled guide surface 30b which extends radially outward from the contact surface 30a.

Figure 6A:
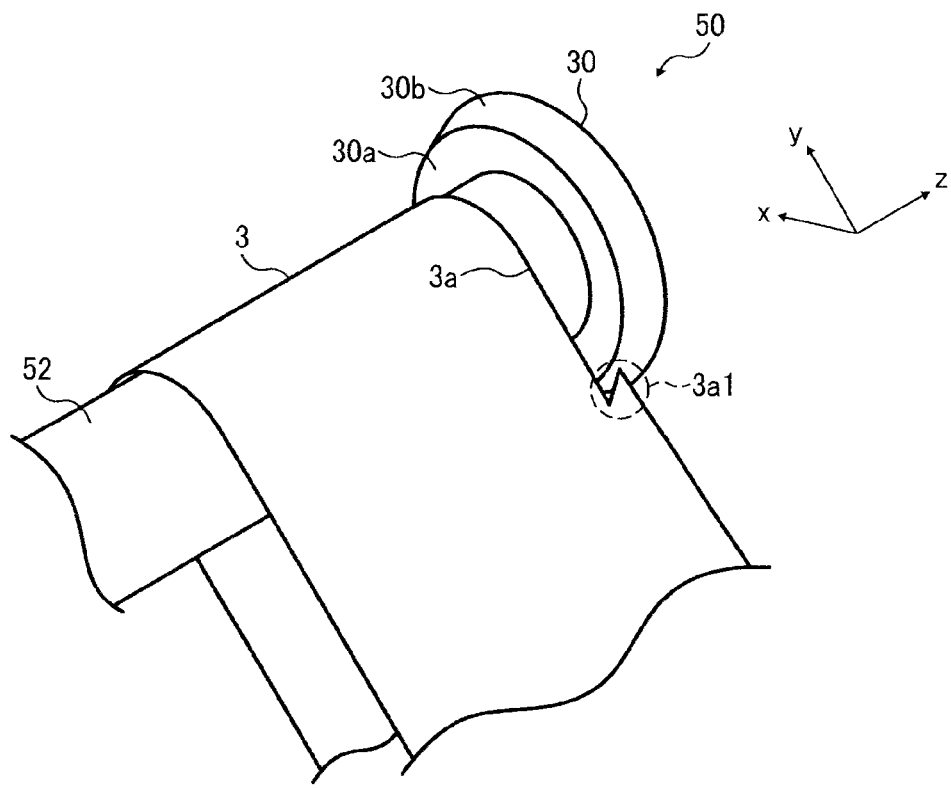
FIGS. 6A and 6B are partial perspective and plan views, respectively, of the belt positioning system of FIGS. 2A and 2B.
Figure 6B:
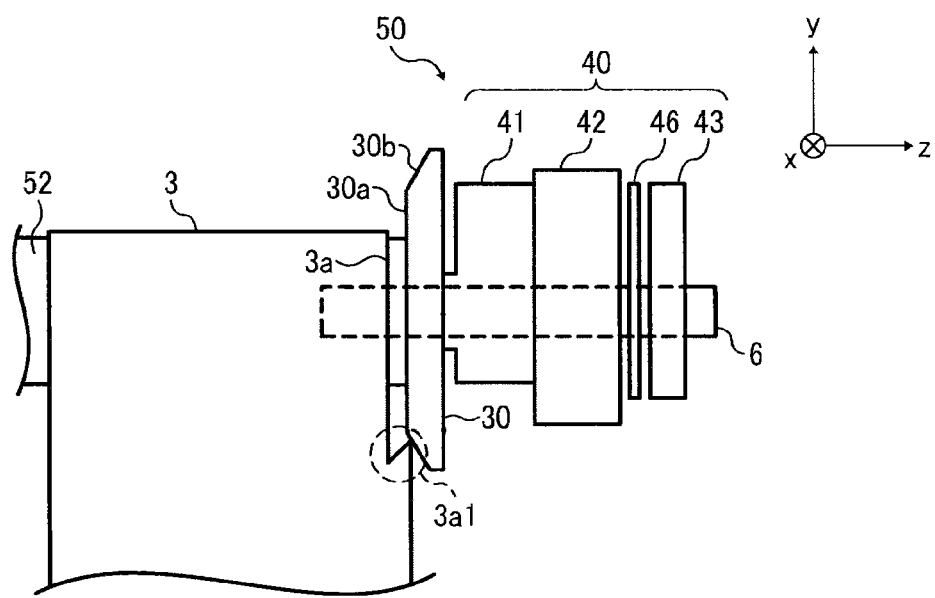

As shown in FIGS. 6A and 6B, where the belt 3 further advances in the trans-axial direction Y, the projection 3a1 starts slipping inward in the axial direction Z along the guide surface 30b.

Figure 7A:
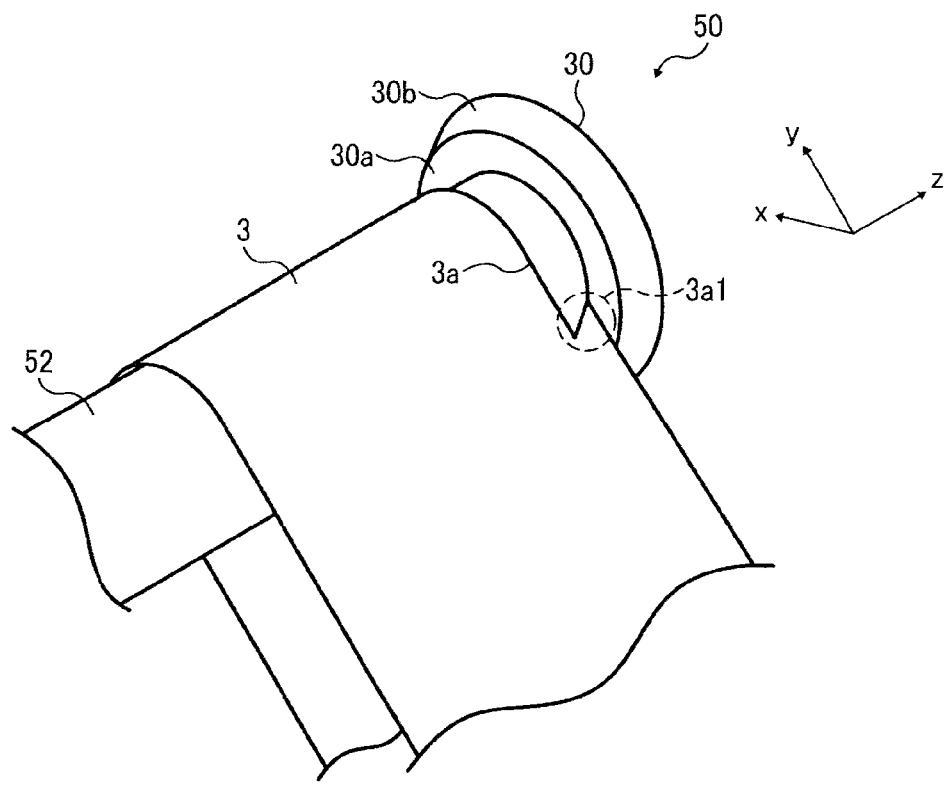
FIGS. 7A and 7B are partial perspective and plan views, respectively, of the belt positioning system of FIGS. 2A and 2B.
Figure 7B:
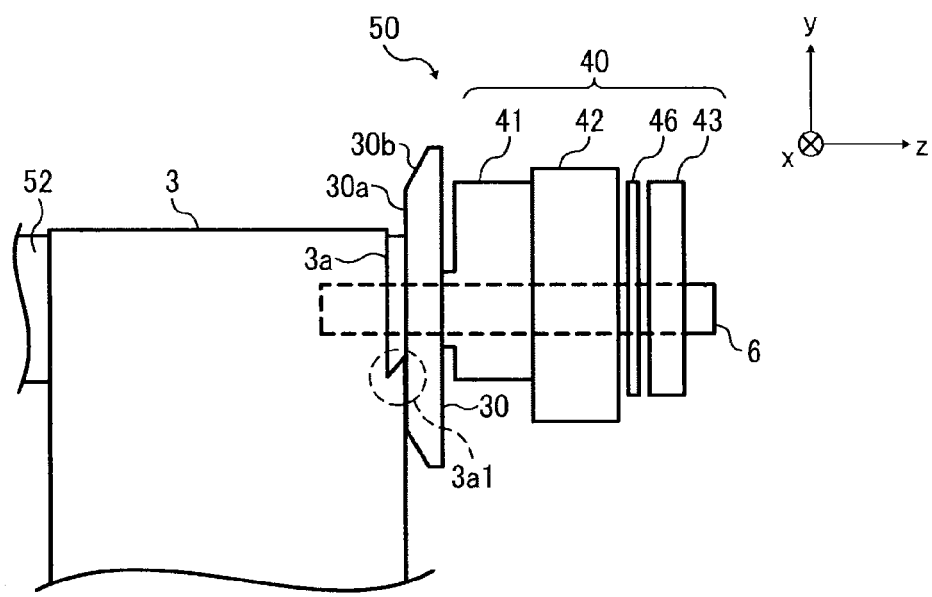

Consequently, as shown in FIGS. 7A and 7B, the projection 3a1 goes off the guide surface 30b to meet the contact surface 30a inward, allowing a following smooth part the belt edge 3a to align with the contact surface 30a. Thereafter, the similar process is repeated whenever the projection 3a1 reaches the tapered flange 30, thereby maintaining the belt 3 in its proper lateral position in the axial direction Z during rotation of the belt 3.

Figure 8A:
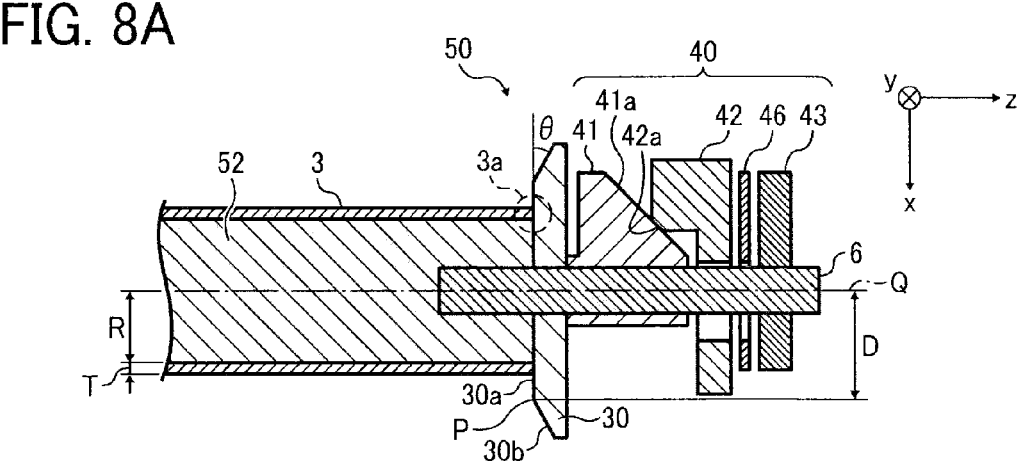
FIGS. 8A and 8B are cross-sectional views at lines 8-8 of FIG. 2B.
Figure 8B:
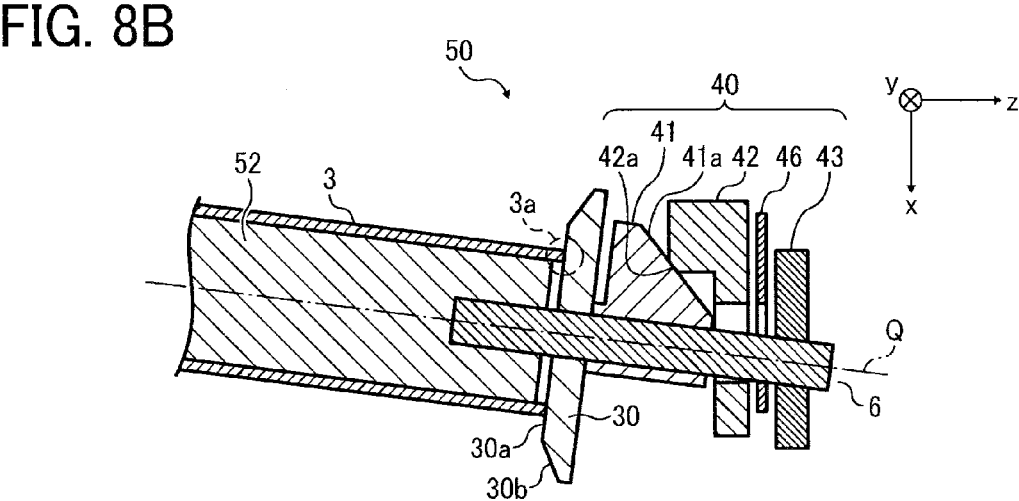

FIGS. 8A and 8B are cross-sectional views at lines 8-8 of FIG. 2B.

As shown in FIGS. 8A and 8B, in the present embodiment, the roller shaft 6 comprises a cylindrical body with a diameter smaller than that of the roller 52, which is coaxially mounted with the roller 52 to integrally rotate with the roller 52. The roller shaft 6 penetrates at least partially into the roller 52 axially inward from the tapered flange 30 and through the belt alignment mechanism 40 axially outward from the tapered flange 30.

The tapered flange 30 comprises an annular flange supported on the roller shaft 6 loosely, that is, without being fastened to the roller shaft 6 and the roller 52. Thus, the flange 30 freely rotates around the roller shaft 6 as the belt 3 moves in the trans-axial direction to cause frictional contact between the belt edge 3a and the contact surface 30a. Also, the flange 30 freely moves in the axial direction Z along the roller shaft 6 as the belt 3 moves laterally outward in the axial direction Z to exert pressure from the belt edge 3a against the contact surface 30a.

Compared to holding the flange stationary in position, allowing free rotation of the flange 30 together with the belt 3 reduces load due to friction between the belt edge 3a and the contact surface 30a, thereby preventing damage to the belt 3 and abrasion on the contact surface 30a.

The contact surface 30a of the flange 30 comprises a flat surface with a circular peripheral shape concentric with the rotational axis of the roller 52. Alternatively, instead of a flat circular configuration, the contact surface 30a may be configured otherwise as long as the flange 30 properly serves its intended function. Thus, the contact surface 30a includes any generally planar surface, including a curved surface, an irregular surface, or any combination thereof. Further, the peripheral shape of the contact surface 30a includes any closed geometric shape, such as a circle, an ellipse, a rectangle, a polygon, or any combination thereof.

The contact surface 30a may be shaped and dimensioned such that a distance D between a central, rotational axis Q of the roller 52 and a periphery P of the contact surface 30a exceeds a sum of a radius R of the roller 52 and a thickness T of the belt 3.

For example, where the assembly is constructed with a roller radius R of 8.78 mm and a belt thickness T of 80 μm, the distance D (which is the radius of the circular contact surface 30a in the present case) may be set to a range greater than 8.86 mm, such as approximately 9.00 mm.

Setting the distance D to an appropriate range ensures the flange 30 properly guides the belt edge 3a to the contact surface 30a without causing undue interference with surrounding structures. Such arrangement effectively prevents substantial displacement or walk of the belt, in which the belt reaches the axial end of the roller and eventually slips off the belt support roller.

The guide surface 30b of the flange 30 comprises a curved, inclined surface that extends outward from the circular periphery of the contact surface 30a while inclined with respect to the flat configuration of the contact surface 30a. Preferably, the guide surface 30b is inclined with respect to the contact surface 30a at an acute angle θ in a range of, for example, 1 to 40 degrees.

With continued reference to FIGS. 8A and 8B, the belt positioning system 50 is shown including the belt alignment mechanism 40 for correcting lateral position of the belt 3.

The belt alignment mechanism 40 includes a stationary member 42 fixed in position, and a slidable member 41 co-movably coupled with the roller shaft 6 and interposed between the tapered flange 30 and the stationary member 42 in the axial direction Z. The slidable member 41 defines an inclined interfacial surface 41a inclined relative to the axial direction Z, along which the slidable member 41 slides against the stationary member 42 to cause the roller shaft 6 to move in a direction perpendicular to the axial direction Z as the flange 30 moves in the axial direction Z upon lateral movement of the belt 3.

More specifically, in the present embodiment, the stationary member 42 comprises a stationary structure having an opening defined therein through which the roller shaft 6 is inserted. The stationary member 42 is positioned axially outward from, and in contact with, the slidable member 41. The stationary member 42 does not move in the axial direction Z upon displacement of the roller shaft 6 and the slidable member 41.

The slidable member 41 comprises an attachment having a through-hole defined therein for passing the roller shaft 6 therethrough. The slidable member 41 is positioned axially outward from, and in contact with, the flange 30, so that the slidable member 41 may move in the axial direction Z along the roller shaft 6 as the flange 30 moves laterally in the axial direction Z, for example, upon lateral movement of the belt 3. A suitable rotation restrictor may be provided around the slidable member 41 to prevent the slidable member 41 from rotating together with the roller shaft 6.

The inclined surface 41a of the slidable member 41 comprises any inclined surface, such as a planar surface, a conical surface, or the like, positioned around the roller shaft 6 to contact an interfacial surface 42a, such as a chamfered edge, of the stationary member 42. In the present embodiment, the inclined surface 41a is disposed on an upper side of the roller shaft 6 and inclined downward toward the stationary member 42 in the axial direction Z. Alternatively, instead, the inclined surface 41a may be disposed on a lower side of the roller shaft 6 and inclined upward toward the stationary member 42 in the axial direction Z.

During operation, where the belt 3 is in its proper operational position, the belt edge 3a merely touches or slightly contacts the flange 30 with only a small contact pressure applied from the belt edge 3a to the flange 30, which does not cause the flange 30 to move outward in the axial direction Z. At this point, the roller shaft 6 remains in its normal position parallel to the axial direction Z, as shown in FIG. 8A.

Where the belt 3 moves laterally outward in the axial direction Z, the contact pressure from the belt edge 3a to the flange 30 increases to cause the flange 30 to move outward in the axial direction Z against the slidable member 41, so that the slidable member 41 slides downward against the stationary member 42 along the inclined interfacial surface 41a. With the slidable member 41 thus descending, the roller shaft 6, which is co-movable with the slidable member 41, is forced downward in the vertical, trans-axial direction X perpendicular to the axial direction Z.

As a result, the roller 52, having its one axial end vertically displaced and the other axial end held in position, becomes inclined relative to other rollers included in the multi-roller assembly, as shown in FIG. 8B. Such inclination of the roller 52 eventually causes the belt 3 to move laterally inward to resume its proper operational position in the axial direction Z.

As mentioned earlier, provision of the flange 30 with the combination of the generally planar contact surface 30a and the angled guide surface 30b prevents an excessive load or pressure between the movable belt 3 and the flange 30. Reducing load on the flange 30 translates into a reduced amount of displacement experienced by the roller 52 where the belt alignment mechanism 40 corrects lateral movement of the belt 3. Combined use of the tapered flange 30 with the belt alignment mechanism 40 thus prevents sudden, excessive movement of the belt 3 in the axial direction Z, which would otherwise result in misregistration of toner images transferred onto the belt surface.

Figure 9:
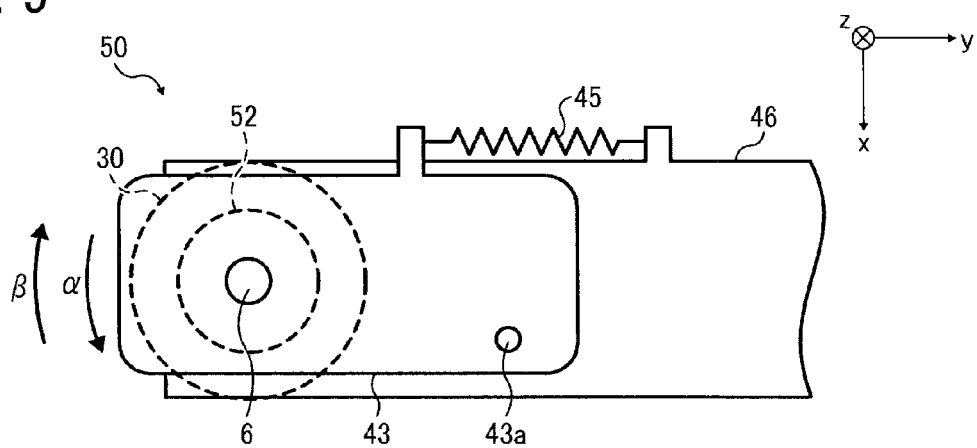
FIG. 9 is a side elevational view of a belt alignment mechanism included in the belt positioning system.

With additional reference to FIG. 9, the belt alignment mechanism 40 is shown further including a stationary support 46 fixed in position, a swivelable member 43 co-movably coupled with the roller shaft 6 while hinged or pivoted to the stationary support 46 to rotate upon displacement of the roller shaft 6, and an elastic member 45 connected between the swivelable member 43 and the stationary support 46 to elastically retain the roller shaft 6 in position.

In the present embodiment, the stationary support 46 comprises a stationary structure having an opening defined therein through which the roller shaft 6 is inserted. The stationary support 46 is positioned axially outward from the stationary member 42. The stationary support 46 does not move in the axial direction Z where the roller shaft 6 moves or is displaced.

In the present embodiment, the swivelable member 43 comprises a positioning lever mounted to the roller shaft 6 via a bearing. The swivelable member 43 is located axially outward from the stationary support 46. A hinge or pivot 43a is provided between the stationary support 46 and the swivelable member 43, around which the swivelable member 43 rotates as the roller shaft 6 moves in a direction perpendicular to the axial direction Z.

In the present embodiment, the elastic member 45 comprises a coil spring disposed in tension between the stationary support 46 and the swivelable member 43. Alternatively, instead of a coil spring, the elastic member 45 may be configured as any suitable elastic material, such as a leaf spring, a rubber band, or the like.

During operation, where the roller shaft 6 moves downward in the vertical, trans-axial direction X for correcting the lateral position of the belt 3, the swivelable member 43 rotates in a first rotational direction α, counterclockwise in FIG. 9, around the hinge 43a.

As rotation of the swivelable member 43 causes the elastic member 45 to stretch, the resultant elastic force, which opposes the change in length of the elastic member 45, causes the swivelable member 43 to rotate backward in a second rotational direction β, clockwise in FIG. 9, around the hinge 43a.

Thus, with the elastic member 45 connected between the swivelable member 43 and the stationary support 46, the roller shaft 6, which is co-movable with the swivelable member 43, tends to move upward after being displaced downward in the trans-axial direction X. Such elastic retention of the roller shaft 6 prevents the slidable member 41 from falling by gravity off the stationary member 42 upon inclination of the roller 52, leading to continuous contact between the interfacial surfaces 41a and 42a of the slidable member 41 and the stationary member 42 which allows for more reliable operation of the belt alignment mechanism 40.

Figure 10A:
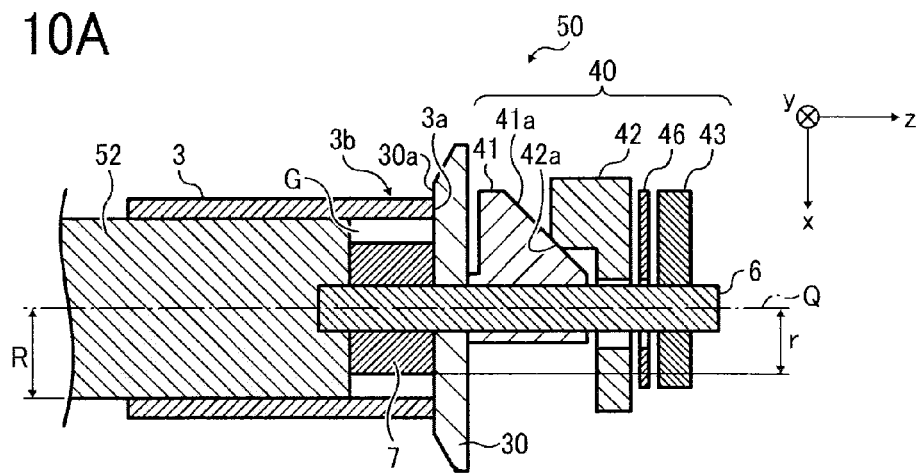
FIGS. 10A and 10B are cross-sectional views of the belt positioning system according to a further embodiment of this patent specification.
Figure 10B:
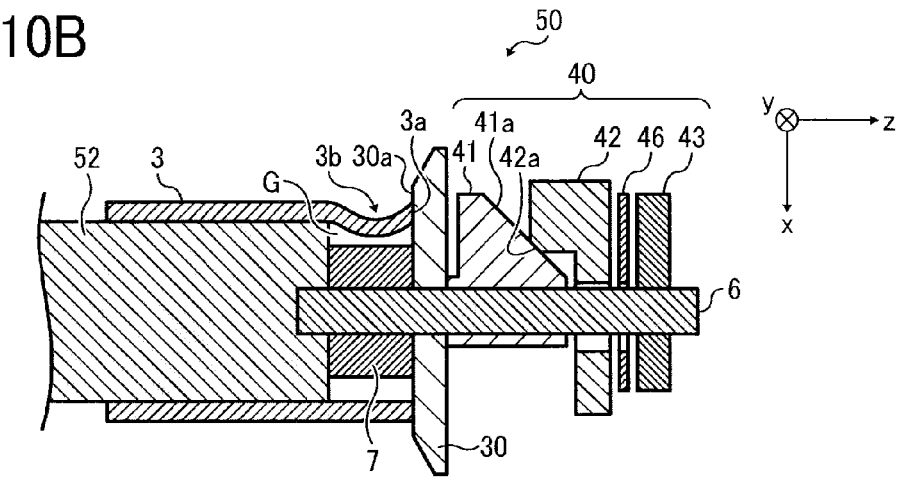

FIGS. 10A and 10B are cross-sectional views of the belt positioning system 50 according to a further embodiment of this patent specification.

As shown in FIGS. 10A and 10B, the overall configuration of the belt positioning system 50 is similar to that depicted in FIGS. 8A and 8B, except that the contact surface 30a of the flange 30 is spaced apart from the axial end of the roller 52 in the axial direction Z to create a spacing or gap G therebetween. Specific configuration and operation of the system 50, including those of the tapered flange 30 and the belt alignment mechanism 40, are similar to those depicted in the foregoing embodiment, and further description thereof is omitted for brevity.

Specifically, the belt positioning system 50 according to the present embodiment includes a spacer 7 interposed between the axial end of the roller 52 and the contact surface 30a of the tapered flange 30. The spacer 7 has a length shorter than a diameter of the roller 52 in a direction perpendicular to the axial direction Z to create a gap G between the adjoining surfaces of the belt 3 and the spacer 7. The spacer 7 may be a separate, independent piece of material, or integrally formed with the tapered flange 30.

More specifically, in the present embodiment, the spacer 7 comprises an annular cylinder coaxially mounted around the shaft 6 of the roller 52. The annular cylindrical spacer 7 has a radius r dimensioned smaller than the radius R of the roller 52 to create a generally annular gap G between the adjoining surfaces of the belt 3 and the spacer 7. It is to be noted that the spacer 7 may be configured in any suitable regular or irregular geometric shape, including not only cylinders, but also spheres, cubes, and other polygonal prisms, which properly serves its intended function.

In the belt positioning system 50, the spacing or gap G created between the contact surface 30a of the flange 30 and the axial end of the roller 52 serves to accommodate a portion of the belt 3 which bends under pressure between the belt 3 and the flange 30, where the belt 3 moves laterally outward in the axial direction Z, for example, due to a lack of parallel alignment between the belt supporting rollers.

During operation, the generally planar contact surface 30a of the flange 30 contacts the adjoining edge 3a of the belt 3 upon lateral displacement of the belt 3, as shown in FIG. 10A. At this point, a portion 3b adjacent to the belt edge 3a is subjected to two mutually opposed forces in the axial direction Z, one being an action force toward the contact surface 30a and the other being a reaction force from the contact surface 30a. As a result, the near-edge portion 3b of the belt 3 bends downward in the vertical, trans-axial direction X, intruding into the gap G between the adjoining surfaces of the belt 3 and the spacer 7, as shown in FIG. 10B.

For comparison purposes, consider a configuration in which the roller end closely contacts the contact surface of the flange. In such cases, the belt cannot bend or deform in the trans-axial direction when subjected to mutually opposed forces in the axial direction. Failure to deform the belt causes a substantial strain continuously acting on the edge of the belt, resulting in cracks or other defects propagating from the edge portion of the belt.

By contrast, the belt positioning system 50 according to the present embodiment effectively prevents strain and concomitant defects on the edge portion of the belt 3, in which the spacing or gap G between the contact surface 30a of the flange 30 and the axial end of the roller 52 in the axial direction Z enables the belt 3 to bend or deform in the trans-axial direction X, thereby relieving an excessive load or pressure between the movable belt 3 and the flange 30.

In addition, reducing load on the flange 30 translates into a reduced amount of displacement experienced by the roller 52 where the belt alignment mechanism 40 corrects lateral movement of the belt 3. Combined use of the spacing or gap G with the belt alignment mechanism 40 thus prevents sudden, excessive movement of the belt 3 in the axial direction Z, which would otherwise result in misregistration of toner images transferred onto the belt surface.

Figure 11:
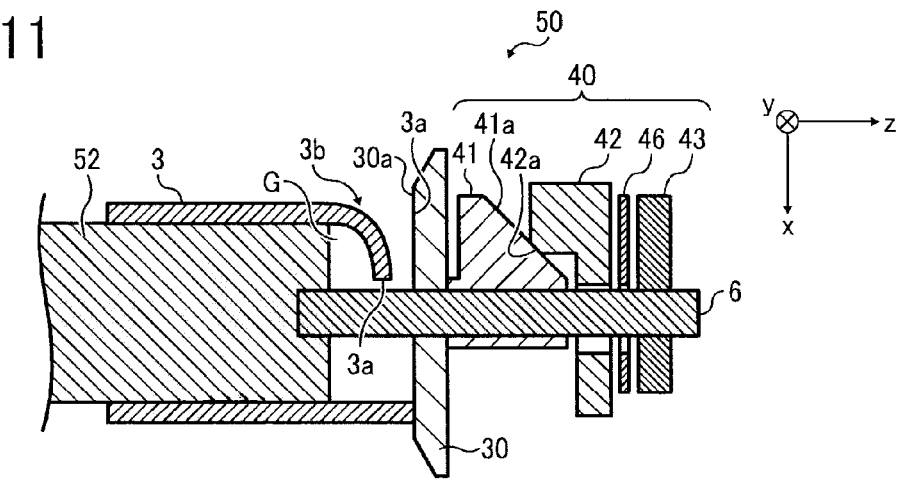
FIG. 11 is a cross-sectional view of the belt positioning system according to a further embodiment of this patent specification.

Again, for comparison purposes, consider a configuration in which no spacer is provided between the axial end of the roller and the contact surface of the tapered flange, with reference to FIG. 11. In such cases, the edge or near-edge portion of the belt 3 can readily come off the contact surface 30a of the flange 30 to bend excessively downward by gravity into a relatively large space left between the adjoining surfaces of the belt 3 and the roller shaft 6, which would cause a substantial bending stress to damage the belt.

By contrast, provision of the spacer 7 between the contact surface 30a of the flange 30 and the axial end of the roller 52 in the axial direction Z prevents a substantial bending stress or damage to the belt 3, since the spacer 7 functions as a belt edge support that forms a raised platform around the roller shaft 6 on which the edge or near-edge portion of the belt 3 can rest without bending excessively downward within the gap G.

Although a particular configuration has been illustrated, the belt positioning system 50 according to this patent specification may be configured otherwise than that described herein. For example, instead of providing the tapered flange 30 to only one axial end of a specific roller, the tapered flange may be operatively connected to each of two axial ends of the roller. Further, the tapered flange 30 may be provided to more than one of the plurality of generally parallel rollers about which the movable belt is entrained.

Moreover, the belt positioning system 50 may be employed in any type of imaging equipment incorporating a multi-roller belt support assembly, such as an intermediate transfer unit for transferring a toner image from a photoconductive surface, a conveyance unit for conveying a recording medium, and a fixing unit for fixing a toner image in place on a recording medium, included in the image forming apparatus, such as a photocopier, facsimile machine, printer, plotter, or multifunctional machine incorporating several of these features.

In each of those alternative embodiments, various beneficial effects may be obtained owing to provision of the tapered flange 30 and other aspects of the belt positioning system 50 according to this patent specification.

Numerous additional modifications and variations are possible in light of the above teachings. It is therefore to be understood that, within the scope of the appended claims, the disclosure of this patent specification may be practiced otherwise than as specifically described herein.

What is claimed is:

1. A belt positioning system for positioning a movable belt entrained about a plurality of generally parallel rollers for moving in a trans-axial direction perpendicular to an axial direction in which the rollers extend parallel to each other, the system comprising:
   a shaft extending outward in the axial direction from an axial end of a specific one of the plurality of generally parallel rollers; and
   a tapered flange operatively connected to the axial end and freely rotatable around the roller shaft, the flange including:
   a generally planar contact surface extending generally perpendicular to the axial direction to contact an adjoining edge of the belt; and
   an angled guide surface extending radially outward from the contact surface and having a diameter increasing outward in the axial direction.

2. The system according to claim 1, wherein a distance between a central, rotational axis of the roller and a periphery of the contact surface exceeds a sum of a radius of the roller and a thickness of the belt.

3. The system according to claim 1, wherein the tapered flange is freely rotatable around the roller shaft as the belt moves in the trans-axial direction.

4. The system according to claim 1, wherein the tapered flange is freely movable in the axial direction along the roller shaft as the belt moves laterally in the axial direction.

5. The system according to claim 4, further comprising:
   a belt alignment mechanism disposed around the roller shaft outward from the tapered flange in the axial direction to correct the lateral position of the belt by inclining the roller with respect to others of the plurality of generally parallel rollers.

6. The system according to claim 5, wherein the belt alignment mechanism includes:
   a stationary member fixed in position; and
   a slidable member co-movably coupled with the roller shaft and interposed between the tapered flange and the stationary member in the axial direction,
   the slidable member defining an inclined surface inclined relative to the axial direction, along which the slidable member slides against the stationary member to cause the roller shaft to move in a direction perpendicular to the axial direction as the flange moves in the axial direction upon lateral movement of the belt.

7. The system according to claim 6, wherein the belt alignment mechanism further includes:
   a stationary support fixed in position;
   a swivelable member co-movably coupled with the roller shaft while hinged to the stationary support to rotate upon displacement of the roller shaft; and
   an elastic member connected between the swivelable member and the stationary support to elastically retain the roller shaft in position.

8. The system according to claim 1, wherein the contact surface of the tapered flange is spaced apart from the axial end of the roller in the axial direction to create a gap therebetween.

9. The system according to claim 1, further comprising:
   a spacer interposed between the axial end of the roller and the contact surface of the tapered flange,
   wherein the spacer has a length shorter than a diameter of the roller in a direction perpendicular to the axial direction to create a gap between the adjoining surfaces of the belt and the spacer.

10. The system according to claim 9, wherein the spacer is integrally formed with the tapered flange.

11. The system according to claim 1, wherein the tapered flange is operatively connected to each of two axial ends of the roller.

12. The system according to claim 1, wherein the tapered flange is provided to more than one of the plurality of generally parallel rollers.

13. An image forming apparatus employing the belt positioning system according to claim 1.

14. The image forming apparatus according to claim 13, wherein the system is incorporated in one of an intermediate transfer unit for transferring a toner image from a photoconductive surface, a conveyance unit for conveying a recording medium, and a fixing unit for fixing a toner image in place on a recording medium.

15. The system according to claim 1, wherein the tapered flange is freely rotatable around the roller shaft as the belt moves in the trans-axial direction.

16. The system according to claim 1, wherein the tapered flange is freely movable in the axial direction along the roller shaft as the belt moves laterally in the axial direction.

17. A multi-roller assembly for supporting a movable belt, the assembly comprising:
   a plurality of generally parallel rollers about which the movable belt is entrained for moving in a trans-axial direction perpendicular to an axial direction in which the rollers extend parallel to each other; and
   a shaft extending outward in the axial direction from an axial end of a specific one of the plurality of generally parallel rollers; and
   a tapered flange operatively connected to the axial end and freely rotatable around the roller shaft, the flange including:
   a generally planar contact surface extending generally perpendicular to the axial direction to contact an adjoining edge of the belt; and
   an angled guide surface extending radially outward from the contact surface and having a diameter gradually increasing outward in the axial direction.

* * * * *